(12) United States Patent
Takubo et al.

(10) Patent No.: US 6,288,774 B1
(45) Date of Patent: Sep. 11, 2001

(54) DISTANCE MEASURING DEVICE

(75) Inventors: Masayuki Takubo; Morito Shiohara, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,732

(22) Filed: Dec. 14, 1999

(30) Foreign Application Priority Data

May 27, 1999 (JP) .................................................. 11-147453

(51) Int. Cl.$^7$ ............................... G01C 3/08; G01C 5/00; B62D 1/24; B60T 7/16
(52) U.S. Cl. ......................... 356/4.03; 180/167; 356/3.14
(58) Field of Search .................. 356/3.14, 4.03; 180/167, 169

(56) References Cited

U.S. PATENT DOCUMENTS 5,039,217 * 8/1991 Maekawa et al. .
5,313,262 * 5/1994 Leonard .
5,475,494 * 12/1995 Nishida et al. ..................... 356/4.01
5,528,217 * 6/1996 Adams .

FOREIGN PATENT DOCUMENTS 54-58047 * 10/1979 (JP) .

* cited by examiner

*Primary Examiner*—Stephen C. Buczinski
(74) *Attorney, Agent, or Firm*—Staas & Halsey LLP (57) ABSTRACT

A distance measuring device using markers and capable of accurately measuring distance irrespective of the distance to an object. An optical system converges light from markers affixed to an object on the light receiving surface of a light receiving section. The light receiving section generates an image signal by photoelectric conversion and outputs the generated signal. First marker image acquiring means acquires images of markers, and second marker image acquiring means also acquires images of markers. Selecting means selects the output of the first marker image acquiring means if the distance to the object is short, and selects the images acquired by the second marker image acquiring means if the distance to the object is large. Based on the distance between the marker images selected by the selecting means, computing means computes the distance to the object by trigonometry.

4 Claims, 11 Drawing Sheets

DISTANCE MEASURING DEVICE

BACKGROUND OF THE INVENTION (1) Field of the Invention

The present invention relates to a distance measuring device, and more particularly, to a distance measuring device for measuring a distance to an object having a plurality of markers by obtaining a distance between images of the markers projected on a light receiving section thereof.

(2) Description of the Related Art

In ITS (Intelligent Transport System) etc., for example, a method has been proposed wherein the speed of a vehicle is controlled in such a manner that the distance between the vehicle and one ahead (hereinafter referred to as "preceding vehicle") is always kept constant, to thereby lighten the burden imposed on the driver.

To achieve such control, it is necessary that the distance between the vehicle and the preceding vehicle be measured with accuracy.

Conventionally, a method has been employed in which, for example, two markers are affixed to the rear face of the preceding vehicle and parallax of the markers is optically detected to obtain the distance between the vehicles.

With this method, however, it is difficult to measure with accuracy a wide range of distance from short distance to long distance. Specifically, the visual distance between the markers is small when the markers are viewed from a long distance, and it is therefore desirable that the actual distance between the markers should be significantly large, in order to measure the distance with accuracy. If the actual distance between the markers is large, however, the two markers do not fit in the field of view of a parallax detection camera when viewed from a short distance, and therefore, the markers should desirably be separated at a relatively small distance from each other.

Consequently, a problem of trade-off arises between the long- and short-distance measurements, making accurate measurement difficult.

SUMMARY OF THE INVENTION

An object of the present invention is to provide a distance measuring device capable of accurate distance measurement from short through long distances.

To achieve the above object, there is provided a distance measuring device for measuring a distance to an object having a plurality of markers by obtaining a distance between images of the markers projected on a light receiving section thereof. The distance measuring device comprises first marker image acquiring means for acquiring images of a pair of markers separated at a first distance from each other, from among images of the markers projected on the light receiving section, second marker image acquiring means for acquiring images of another pair of markers separated at a second distance from each other, from among the images of the markers projected on the light receiving section, selecting means for selecting the marker images acquired by the first marker image acquiring means or the marker images acquired by the second marker image acquiring means in accordance with a predetermined condition, and computing means for computing a distance to the object based on the marker images selected by the selecting means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment of the present invention will be hereinafter described with reference to the drawings.

Figure 1:
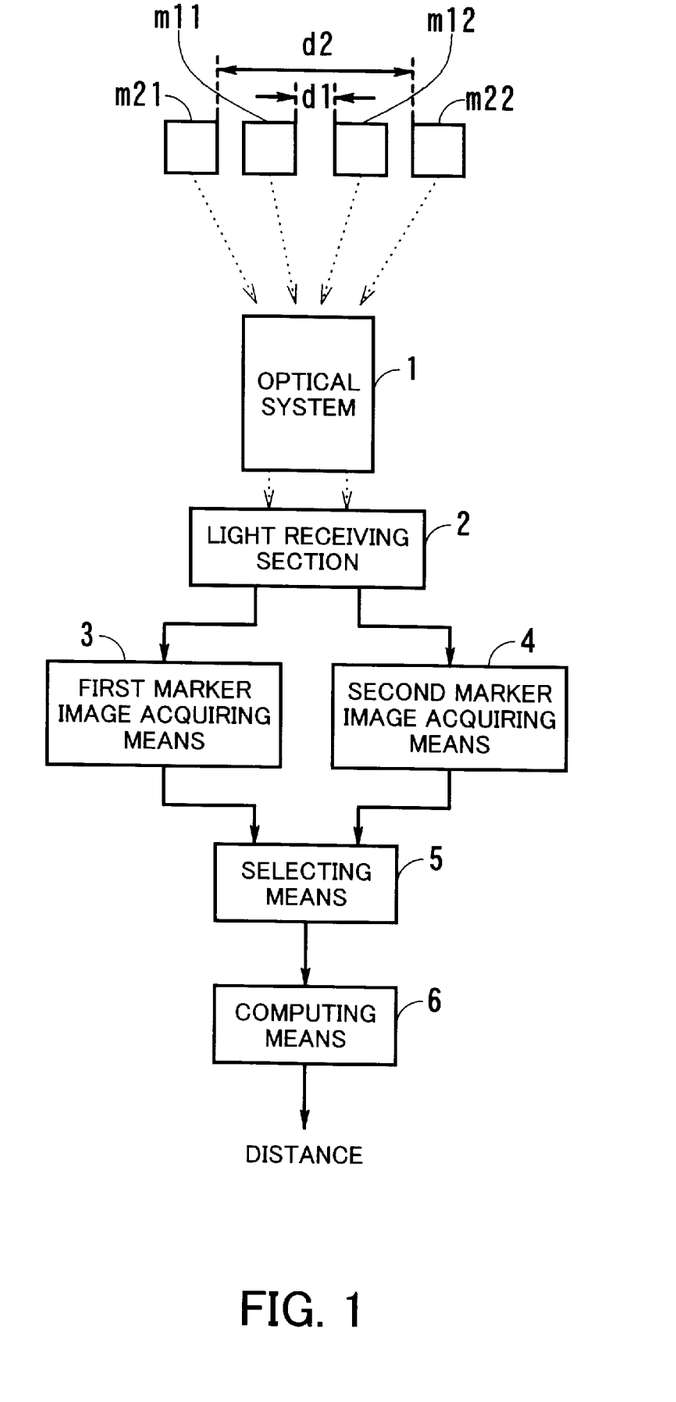
FIG. 1 is a diagram illustrating the principle of operation according to the present invention.

FIG. 1 illustrates the principle of operation according to the present invention. As shown in FIG. 1, a distance measuring device according to the present invention comprises an optical system 1, a light receiving section 2, first marker image acquiring means 3, second marker image acquiring means 4, selecting means 5, and computing means 6.

Markers m11 and m12 (first markers) and markers m21 and m22 (second markers) are affixed to a rear face of a vehicle ahead, or a preceding vehicle. The markers m11 and m12 are used for short-distance measurement and are separated at a distance d1 from each other. The markers m21 and m22 are used for long-distance measurement and are separated at a distance d2 from each other. In the following, these markers are merely called "markers" unless specific ones are to be referred to.

The optical system 1 comprises a plurality of lenses, and light from the markers is converged on a light receiving surface of the light receiving section 2.

The light receiving section 2 comprises a CCD (Charge Coupled Device) etc., for example, and subjects the optical image converged by the optical system 1 to photoelectric conversion to obtain corresponding image signal.

The first marker image acquiring means 3 acquires images corresponding to the first markers from the image signal supplied from the light receiving section 2.

The second marker image acquiring means 4 acquires images corresponding to the second markers from the image signal supplied from the light receiving section 2.

In accordance with a predetermined condition, the selecting means 5 selects and outputs either the images of the first markers acquired by the first marker image acquiring means 3 or the images of the second markers acquired by the second marker image acquiring means 4.

Based on the parallax of the images of the first or second markers selected by the selecting means 5, the computing means 6 computes the distance to the vehicle which is an object of measurement.

Operation according to the principle illustrated in FIG. 1 will be now described.

Let it be assumed that the operation of the distance measuring device is started while the distance to the preceding vehicle is considerably small. In this case, only the markers m11 and m12 fit in the field of view of the optical system 1, and accordingly, the second marker image acquiring means 4 does not acquire images of the second markers m21 and m22.

Consequently, the selecting means 5 unconditionally selects and outputs the images of the markers m11 and m12 acquired by the first marker image acquiring means 3.

The computing means 6 obtains a distance between the images of the markers m11 and m12 supplied from the selecting means 5, to compute the distance to the preceding vehicle.

Now, let it be assumed that the distance to the preceding vehicle has increased for some reason.

As the distance between the vehicles increases, images of the markers m21 and m22 come to be projected on the light receiving section 2. Thus, the images are acquired by the second marker image acquiring means 4 and supplied to the selecting means 5. However, also in this case, the selecting means 5 selects the images from the first marker image acquiring means 3 and supplies same to the computing means 6.

As the distance between the vehicles further increases, the distance between the images of the markers m11 and m12 projected on the light receiving section 2 gradually reduces, and when the vehicles are separated from each other by a distance greater than a predetermined distance, the images of the markers m11 and m12 become contiguous on the light receiving section 2.

In such cases, the distance between the markers m11 and m12 cannot be detected with accuracy, and therefore, the selecting means 5 selects the images acquired by the second marker image acquiring means 4, in place of the images from the first marker image acquiring means 3.

Consequently, the computing means 6 computes the distance to the preceding vehicle based on the distance between the images of the second markers m21 and m22.

The distance d2 between the markers m21 and m22 is greater than the distance d1 between the markers m11 and m12 (d2>d1), and therefore, even in cases where the images of the first markers m11 and m12 have become contiguous with each other, the distance between the vehicles can be accurately measured based on the second markers separated from each other at the predetermined distance.

As the vehicles thus separated (at a certain distance from each other) become closer to each other, the distance between the images of the markers m11 and m12 increases and becomes equal to a predetermined distance at a certain point of time. In this case, the selecting means 5 selects the images from the first marker image acquiring means 3, so that the distance between the vehicles is again computed based on the markers m11 and m12.

In the above description, the selecting means 5 selects the first or second markers in accordance with the distance between the marker images. Alternatively, the currently detected distance between the vehicles, for example, may be used for the purpose, to select the second markers when the detected distance is greater than or equal to a predetermined distance, and select the first markers when the detected distance is smaller than the predetermined distance.

As shown in the diagram illustrating the principle of the present invention, the distance measuring device according to the invention selects optimum markers for the distance measurement and thus can accurately measure distance from short through long distances.

An embodiment of the present invention will be now described.

Figure 2:
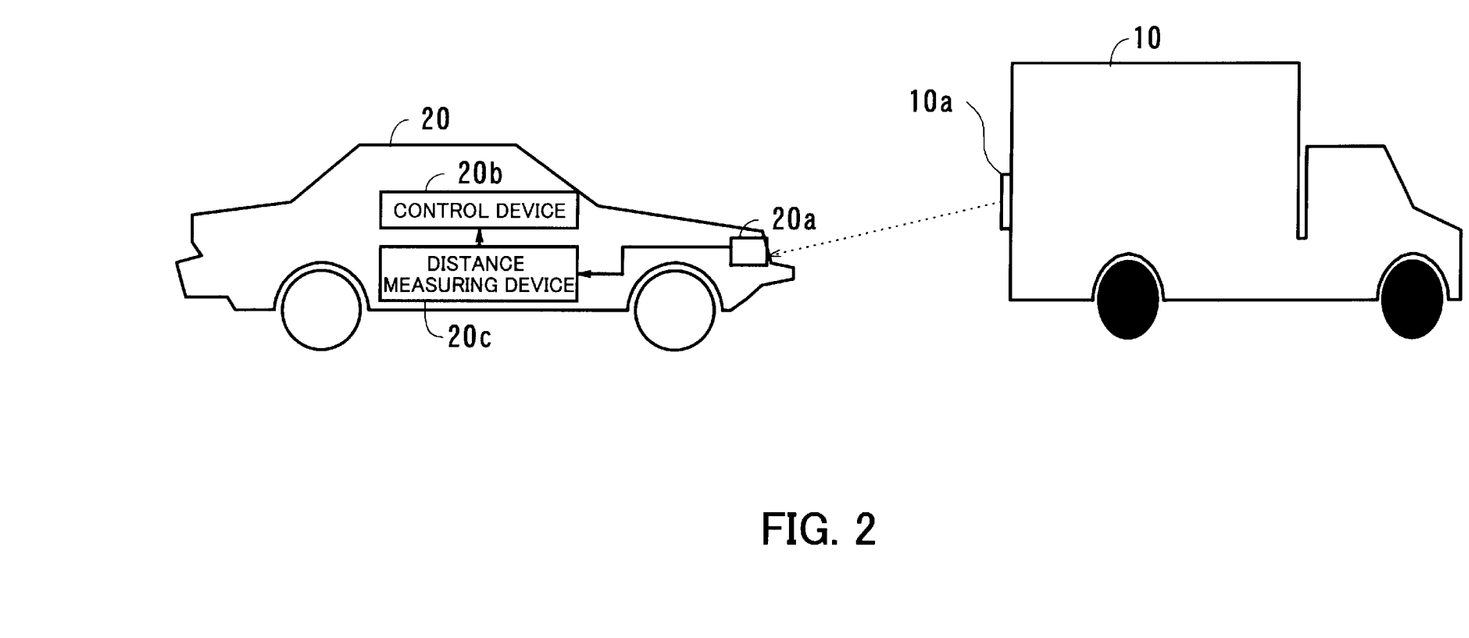
FIG. 2 is a diagram outlining an embodiment of the present invention.

FIG. 2 illustrates an outline of the embodiment of the invention. In FIG. 2, a vehicle 10 is in front of a vehicle 20, and a distance to the preceding vehicle is measured at the vehicle 20.

A marker 10a is affixed to the rear face of the vehicle 10, and the vehicle 20 uses the marker as reference to measure the distance to the preceding vehicle.

Figure 3:
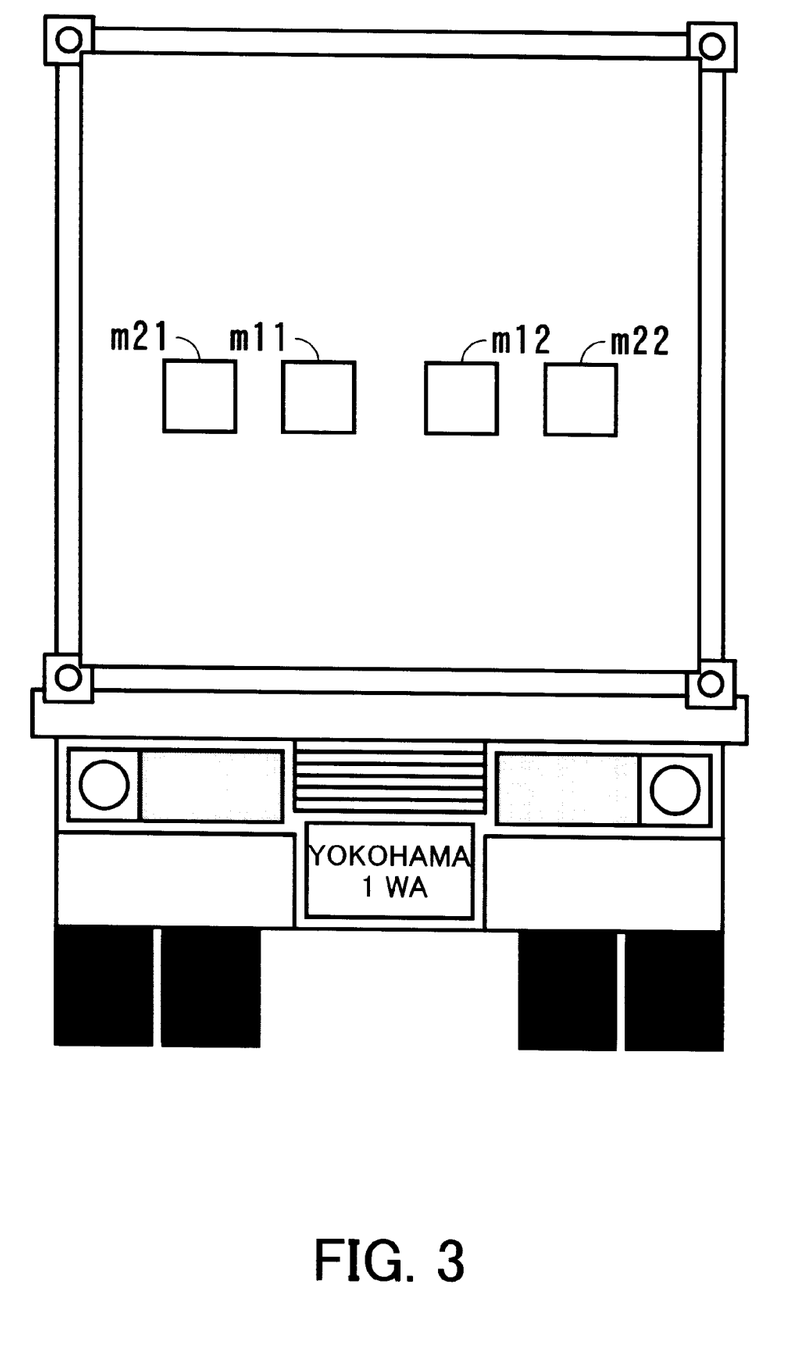
FIG. 3 is a diagram showing the rear face of a vehicle 10 appearing in FIG. 2.

FIG. 3 shows the outside appearance of the rear of the vehicle 10. As shown in FIG. 3, two pairs of markers, that is, the markers m11 and m12 separated from each other at the distance d1 and the markers m21 and m22 separated from each other at the distance d2, like those shown in the diagram of FIG. 1, are affixed to the rear face of the vehicle 10.

These markers each comprise, for example, infrared LEDs (Light Emitting Diodes) or the like arranged in matrix form and are turned on and off at predetermined intervals, for example, to be detected easily.

Referring again to FIG. 2, the vehicle 20 is equipped with an optical system 20a, a control device 20b and a distance measuring device 20c, which constitute a control mechanism for measuring the distance to the vehicle 10 and for controlling the vehicle speed in accordance with the measured distance.

The optical system 20a converges light from the marker 10a affixed to the preceding vehicle 10 and allows the light to fall upon a CCD, not shown.

The distance measuring device 20c is supplied with an image signal which is obtained by the CCD through conversion of the light converged by the optical system 20a to electrical signal, and detects a parallax of the marker 10a to obtain the distance to the preceding vehicle 10.

Based on the distance obtained by the distance measuring device 20c, the control device 20b suitably controls the accelerator, brake, transmission, etc. so that the distance to the preceding vehicle 10 may be maintained constant.

Figure 4:
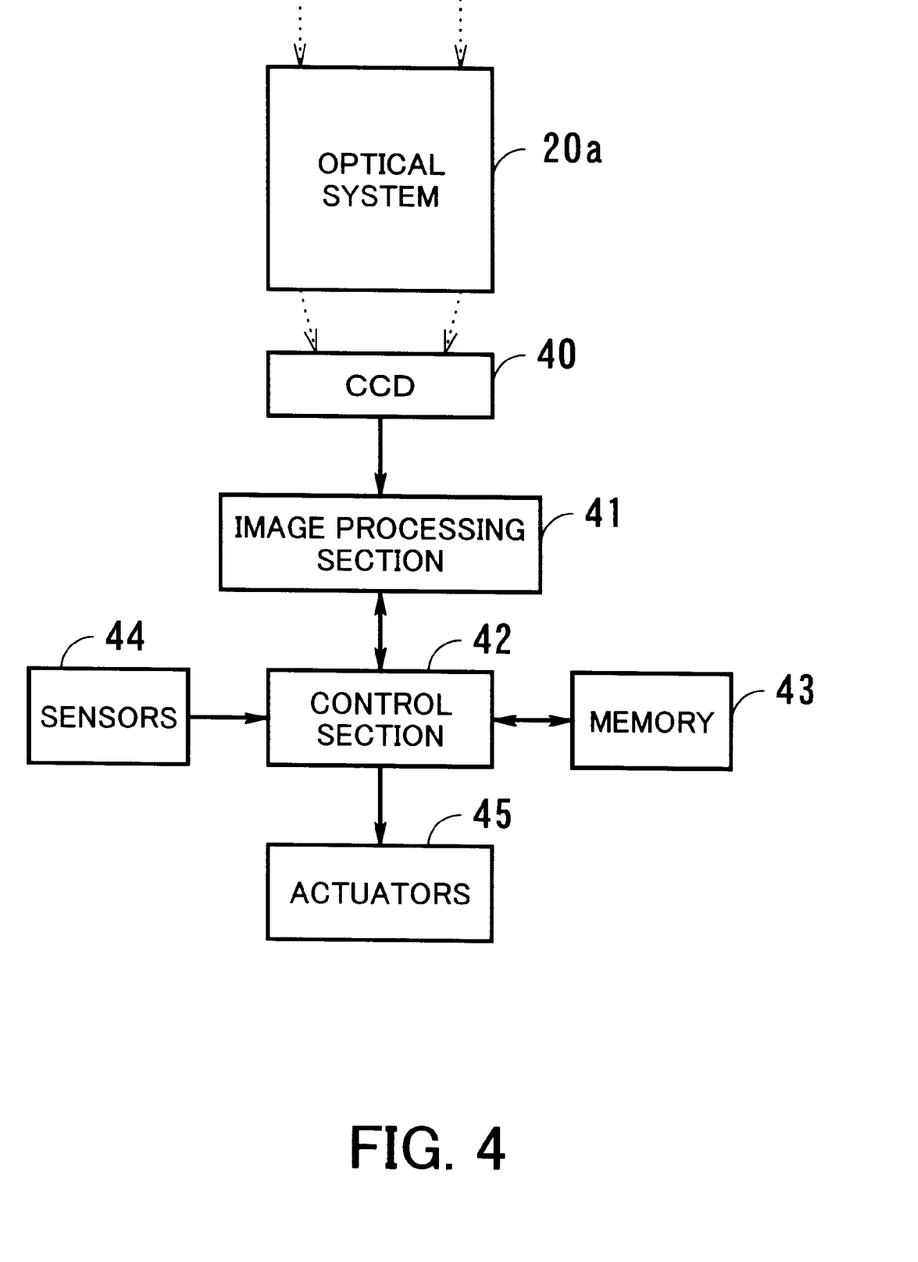
FIG. 4 is a diagram showing in detail the configuration of an optical system, a distance measuring device, and a control device installed in a vehicle 20 appearing in FIG. 2.

FIG. 4 shows in detail the configuration of the optical system 20a, the control device 20b and the distance measuring device 20c installed in the vehicle 20.

In FIG. 4, the optical system 20a comprises a plurality of lenses and converges an optical image of the preceding vehicle 10 on the light receiving surface of a CCD 40.

The CCD 40 subjects the light converged by the optical system to photoelectric conversion, to thereby obtain corresponding image signal.

An image processing section 41 performs, for example, edge detection or the like on the image signal output from the CCD 40, to acquire images corresponding to the markers (hereinafter referred to as marker images).

Using the marker images acquired by the image processing section 41, a control section 42 computes the distance to the vehicle 10, and then controls various parts of the vehicle 20 in accordance with the computed distance.

A memory 43, which comprises a semiconductor memory etc., temporarily stores the marker images acquired by the image processing section 41, and also temporarily stores data derived in the middle of computation, programs, etc. when the control section 42 performs predetermined control. The memory 43 is provided also with a nonvolatile memory for storing various programs executed by the control section 42, data (e.g., distances d1 and d2 between the markers), etc.

Sensors 44 detect information such as vehicle speed, accelerator opening, state of the transmission, etc. and supplies the information to the control section 42.

Actuators 45 include an accelerator controller, a brake controller, etc., and control the traveling state of the vehicle 20 in accordance with a command from the control section 42.

Operation of the embodiment will be now described.

Light from the markers affixed to the preceding vehicle 10 is converged by the optical system 20a, so that an optical image of the markers is formed on the light receiving surface of the CCD 40.

The CCD 40 converts the optical image to image signal by photoelectric conversion and outputs the thus-obtained image signal.

The image processing section 41 performs, for example, edge detection on the image signal output from the CCD 40, thereby acquiring marker images, which are then supplied to the control section 42.

The control section 42 selects a pair of marker images, from among the marker images acquired by the image processing section 41, by a method described later, and obtains a distance between the selected two marker images. Using the obtained distance between the images and the actual distance between the markers stored in advance in the memory 43, the control section 42 computes the distance to the vehicle 10 according to the principle of triangulation.

In accordance with the thus-computed distance between the vehicles and current traveling conditions of the vehicle 20 detected by the sensors 44, the control section 42 suitably controls the actuators 45, thereby automatically controlling the vehicle 20.

Figure 5:
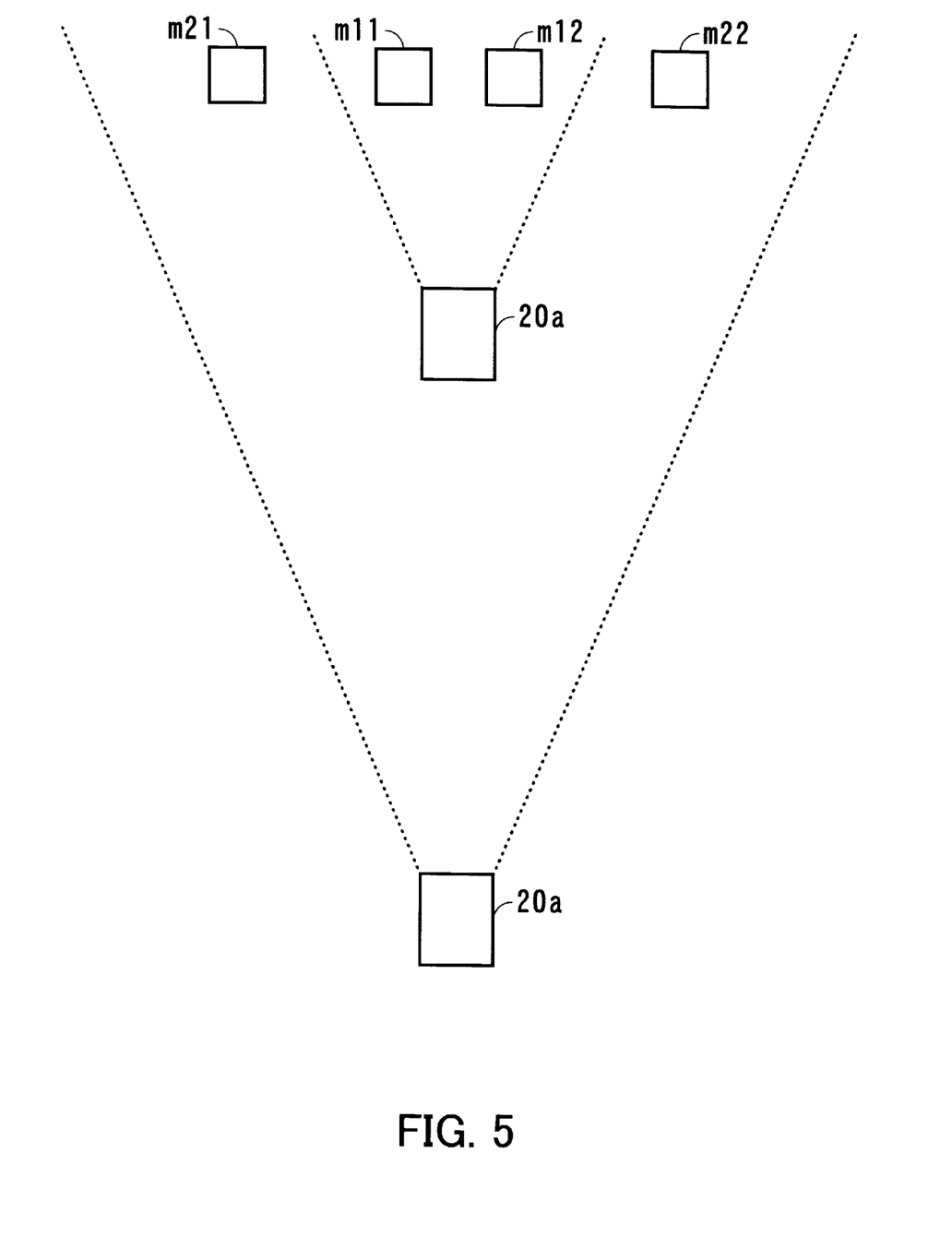
FIG. 5 is a diagram illustrating the relationship between the optical system and markers in cases where the distance between the vehicles 10 and 20 is small and large.

FIG. 5 shows the relationship between the optical system and the markers in cases where the distance between the vehicles 10 and 20 is small and large.

Figure 6:
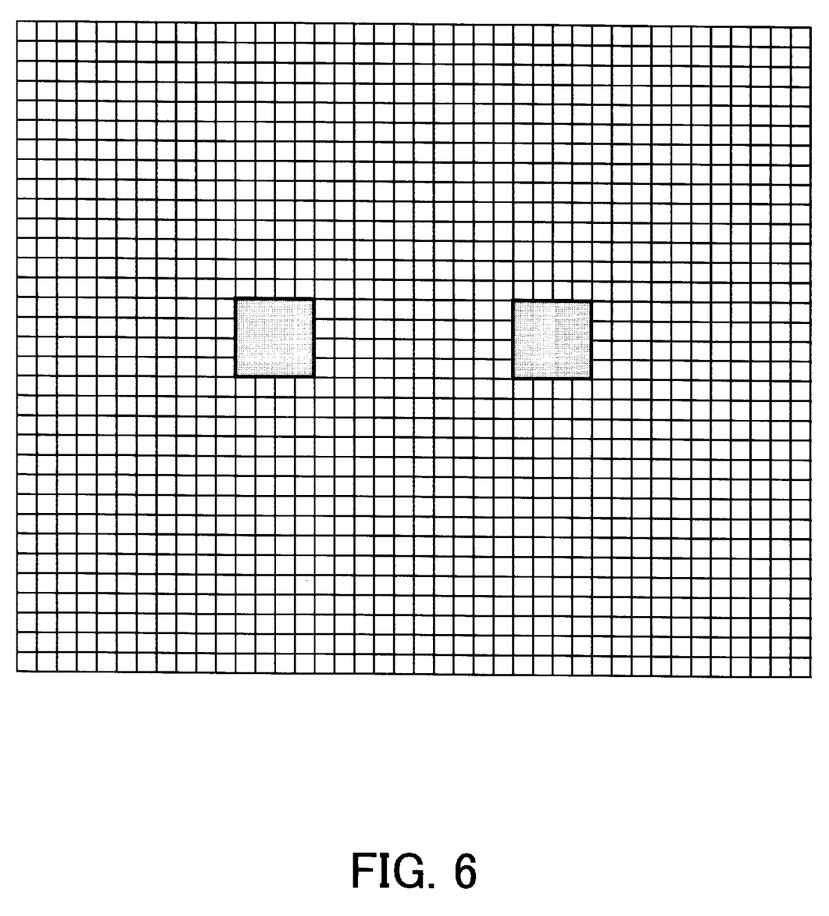
FIG. 6 is a diagram showing an example of an image output from a CCD when the distance between the vehicles 10 and 20 is small.

As shown in the upper part of FIG. 5, where the distance between the vehicles is small, only the markers m11 and m12 fit in the field of view (range indicated by the dotted lines) of the optical system 20a. In such cases, therefore, the CCD 40 outputs an image as shown in FIG. 6. In FIG. 6, small squares defined by the grid respectively represent pixels.

On the other hand, where the distance between the vehicles is large, all of the markers m11, m12, m21 and m22 fit in the field of view (range indicated by the dotted lines) of the optical system 20a, as shown in the lower part of FIG. 5.

Figure 7:
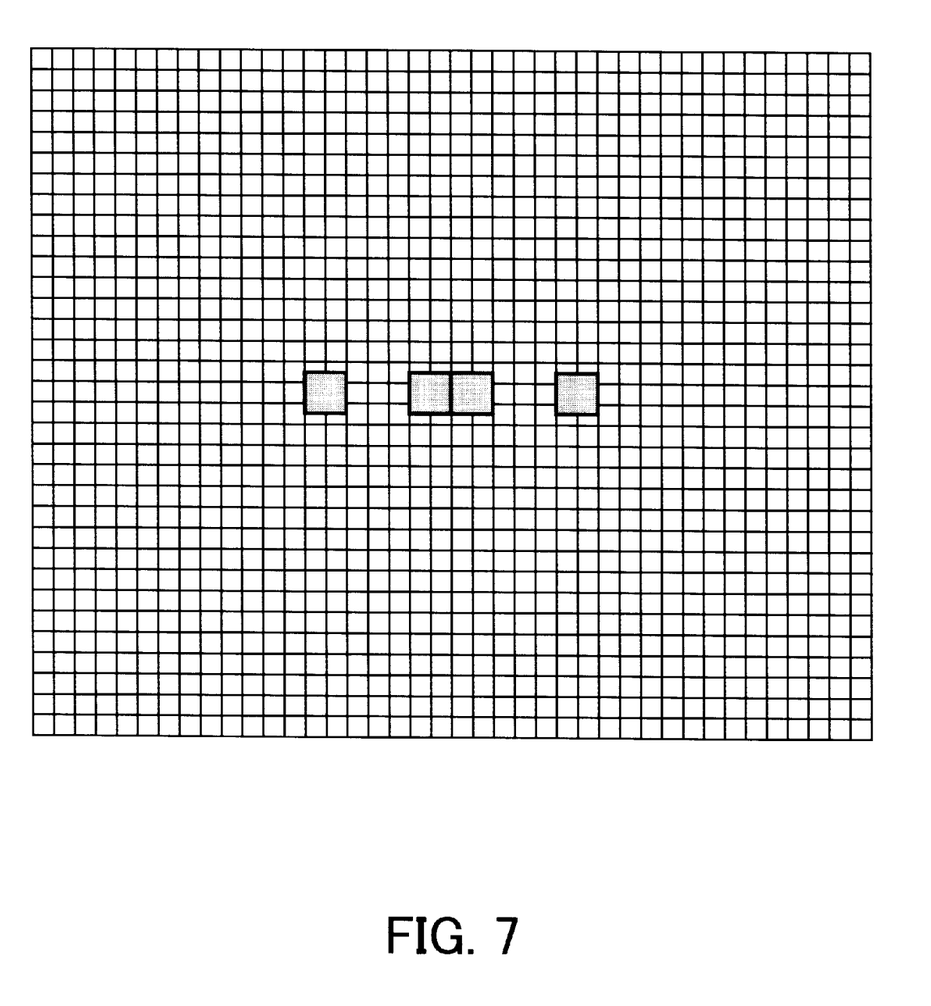
FIG. 7 is a diagram showing an example of an image output from the CCD when the distance between the vehicles 10 and 20 is large.

In such cases, therefore, the CCD 40 outputs an image as shown in FIG. 7. As shown in the central part of FIG. 7, the images of the markers m11 and m12 are contiguous with each other. With such contiguous images, the distance between the markers is computed at "0", so that the distance between the vehicles cannot be obtained.

The following analyzes the condition for contiguity of markers with each other.

Figure 8:
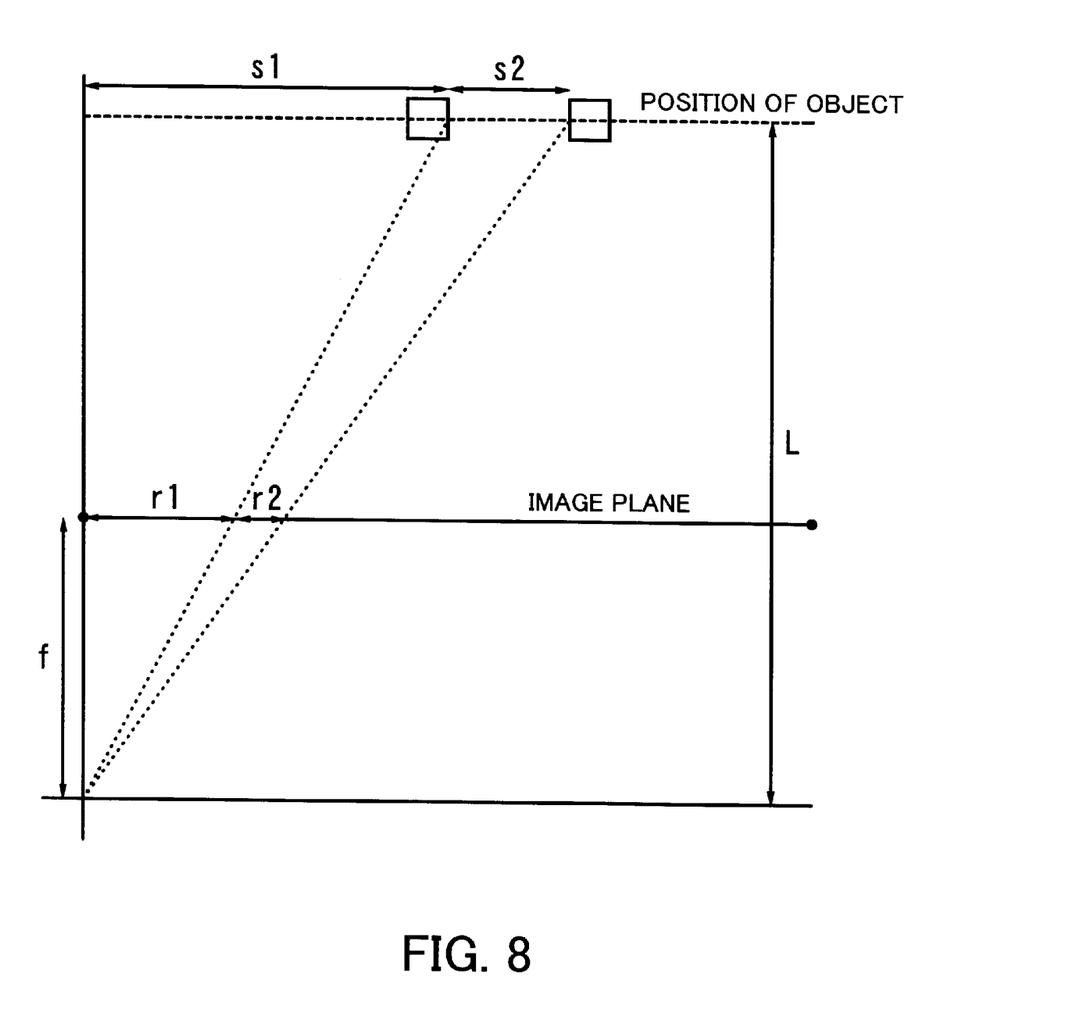
FIG. 8 is a diagram illustrating the relationship between markers and images projected on the CCD.

FIG. 8 shows the relationship between markers and marker images projected on the CCD 40 in the case where the markers are away from the optical system 20a at a distance L in the direction of the optical axis of the optical system and at a distance s1 in a direction perpendicular to the optical axis.

In FIG. 8, "f" denotes the focal distance of the optical system 20a, "s1" denotes the deviation of the markers from the optical axis, "s2" denotes the distance between the markers, "r1" denotes a deviation on an image plane of marker images from the optical axis, and "r2" denotes the distance between the marker images on the image plane.

In this case, provided the resolution of the CCD 40, that is, the number of pixels per unit length, is P, then f, L, P and m have the following relationships:

$$f:L=P\cdot r1:s1 \qquad (1)$$

$$f:L=P(r1+r2):(s1+s2) \qquad (2)$$

Transforming equations (1) and (2) provides the following equations (3) and (4), respectively:

$$P\cdot r1\cdot L=f\cdot s1 \qquad (3)$$

$$P(r1+r2)L=f(s1+s2) \qquad (4)$$

From equations (3) and (4), the following equation is obtained:

$$P\cdot r2\cdot L=f\cdot s2 \qquad (5)$$

When $P\cdot r2 \leq 1$ pixel, the marker images become contiguous with each other; therefore, the condition for non-contiguity of the images can be given as follows:

$$s2>L/f \qquad (6)$$

Accordingly, the control section 42 suitably selects the markers m11 and m12 or the markers m21 and m22 to compute the distance so that the relationship (6) may be satisfied. Specifically, when the distance between the vehicles is small, the markers m11 and m12 are selected, and when the relationship (6) is not fulfilled because of increase in the distance, the markers m21 and m22 are selected.

By thus suitably selecting the markers, it is possible to measure distance with the use of optimum markers, whereby the accuracy of distance measurement can be improved.

Figure 9:
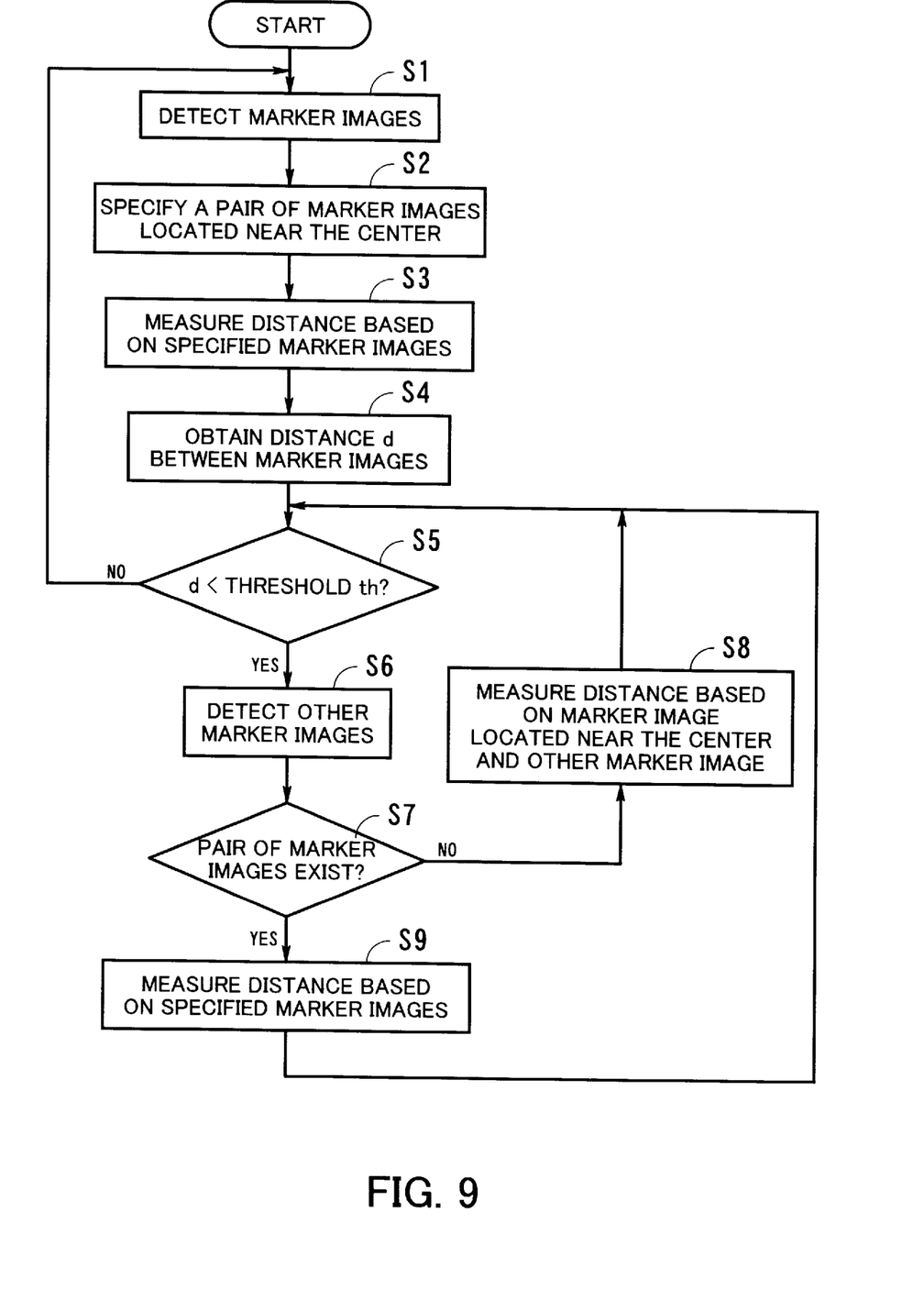
FIG. 9 is a flowchart illustrating an example of a process executed in the vehicle 20 appearing in FIG. 2.

An example of a process executed on the part of the vehicle 20 will be now described. FIG. 9 is a flowchart exemplifying a process executed at the vehicle 20. Upon start of the process shown in the flowchart, the following steps are executed.

[S1] The image processing section 41 detects marker images from the image signal supplied from the CCD 40.

[S2] The control section 42 specifies a pair of markers located near the center, from among the marker images acquired by the image processing section 41.

For example, the control section 42 specifies the images corresponding to the markers m11 and m12 from the image signal.

[S3] Using the specified markers, the control section 42 computes the distance to the vehicle 10 by trigonometry.

[S4] The control section 42 obtains a distance d between the markers.

[S5] The control section 42 determines whether or not d is smaller than a predetermined threshold th. If the former is smaller than the latter, the flow proceeds to Step S6; otherwise the flow returns to Step S1 and a similar process is repeated.

[S6] The control section 42 detects other marker images than those specified in Step S2 from the image signal.

For example, the control section 42 detects the marker images corresponding to the markers m21 and m22.

[S7] The control section 42 determines whether or not there is a pair of marker images. If a pair of marker images exists, the flow proceeds to Step S9; if not, the flow proceeds to Step S8.

[S8] The control section 42 measures the distance between the vehicles based on the marker image located near the center and the other marker image detected in Step S6.

For example, in cases where only the marker m12 (marker located near the center) and the marker m22 (other marker) can be detected, the distance between the vehicles is measured using these markers. To attain this, data about the distance between the markers m12 and m22 also needs to be stored beforehand in the memory 43.

[S9] Based on the specified pair of marker images, the control section 42 measures the distance between the vehicles.

Namely, using the marker images corresponding to the markers m21 and m22, the control section 42 measures the distance between the vehicles.

In the process described above, the markers m11 and m12 are used when the distance between the captured marker images is greater than or equal to the predetermined threshold th, and the markers m21 and m22 are used when the distance is smaller than the predetermined threshold th, to measure the distance between the vehicles. Thus, optimum markers can be used depending upon the distance, whereby the accuracy of distance measurement can be improved.

In the above process, the marker images to be used are switched in accordance with the distance between the images. A process similar to the above-described process may alternatively be performed using the distance between the vehicles measured by the control section 42.

Figure 10:
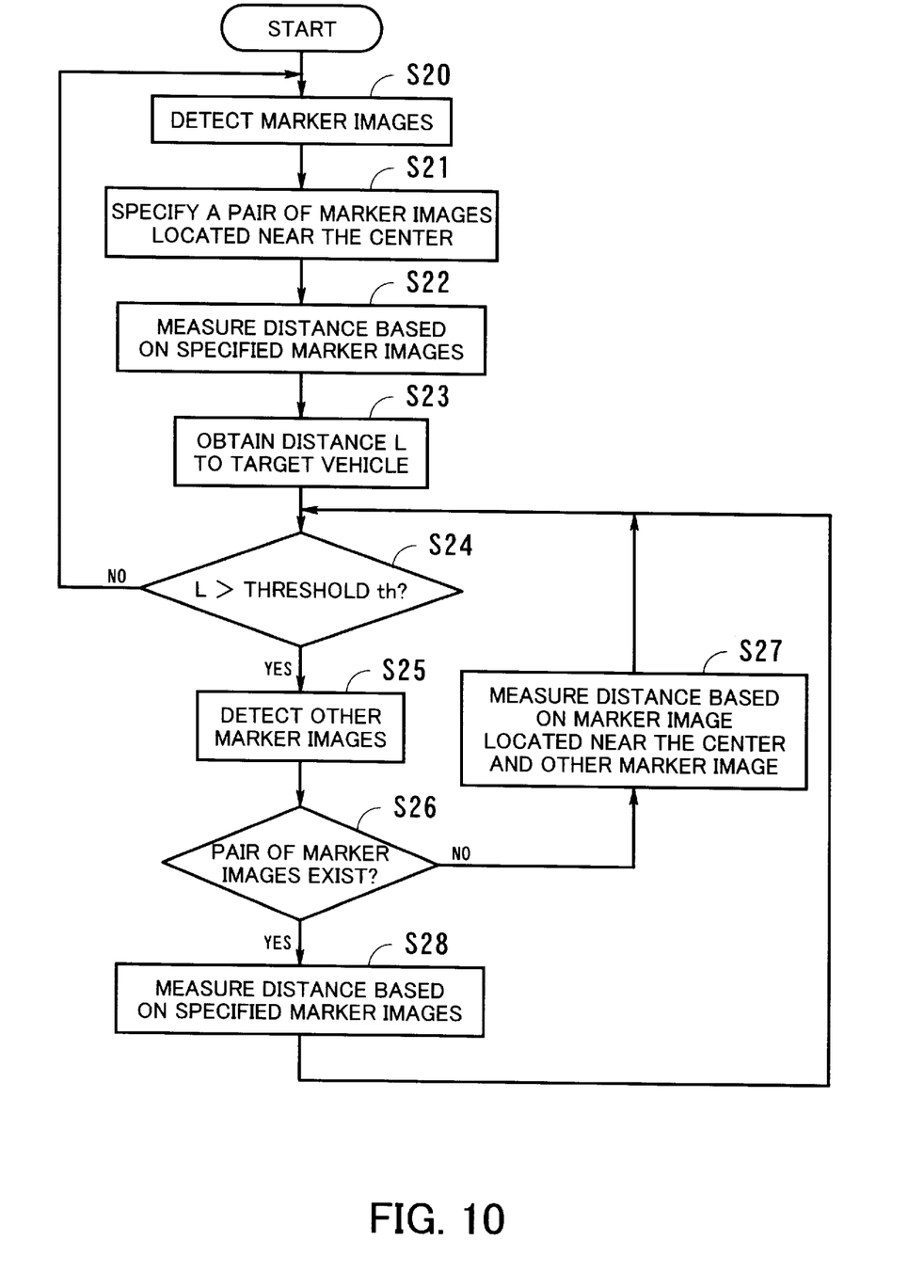
FIG. 10 is a flowchart illustrating another example of the process executed in the vehicle 20 appearing in FIG. 2.

FIG. 10 is a flowchart illustrating an example of such process. Upon start of the process shown in the flowchart, the following steps are executed.

[S20] The image processing section 41 detects marker images from the image signal supplied from the CCD 40.

[S21] The control section 42 specifies a pair of markers located near the center, from among the marker images acquired by the image processing section 41.

For example, the control section 42 specifies the marker images corresponding to the markers m11 and m12 from the image signal.

[S22] Using the specified marker images, the control section 42 measures the distance to the vehicle 10 by trigonometry.

[S23] The control section 42 obtains a distance L between the vehicles.

[S24] The control section 42 determines whether or not L is smaller than a predetermined threshold th. If the former is greater than the latter, the flow proceeds to Step S25; otherwise the flow returns to Step S20 and a similar process is repeated.

The threshold th is calculated on the basis of expression (6) above.

[S25] The control section 42 detects other marker images than those specified in Step S21 from the image signal.

For example, the control section 42 detects the marker images corresponding to the markers m21 and m22.

[S26] The control section 42 determines whether or not there is a pair of marker images. If a pair of marker images exists, the flow proceeds to Step S28; if not, the flow proceeds to Step S27.

[S27] The control section 42 measures the distance between the vehicles based on the marker image located near the center and the other marker image detected in Step S25.

For example, in cases where only the marker m12 (marker located near the center) and the marker m22 (other marker) can be detected, the distance between the vehicles is measured using these markers.

[S28] Based on the specified pair of marker images, the control section 42 measures the distance between the vehicles.

Namely, using the markers m21 and m22, the control section 42 measures the distance between the vehicles.

In the process described above, the markers m11 and m12 are used when the distance L between the vehicles is smaller than the predetermined threshold th, and the markers m21 and m22 are used when the distance is greater than the predetermined threshold th, to measure the distance between the vehicles. Thus, optimum markers can be used depending upon the distance, as in the aforementioned case, whereby the accuracy of distance measurement can be improved.

In the foregoing embodiment, two pairs of markers of identical sizes are used, but markers usable in the present invention are not limited to such markers alone. For example, three pairs or more of markers of different size may be used.

Figure 11:
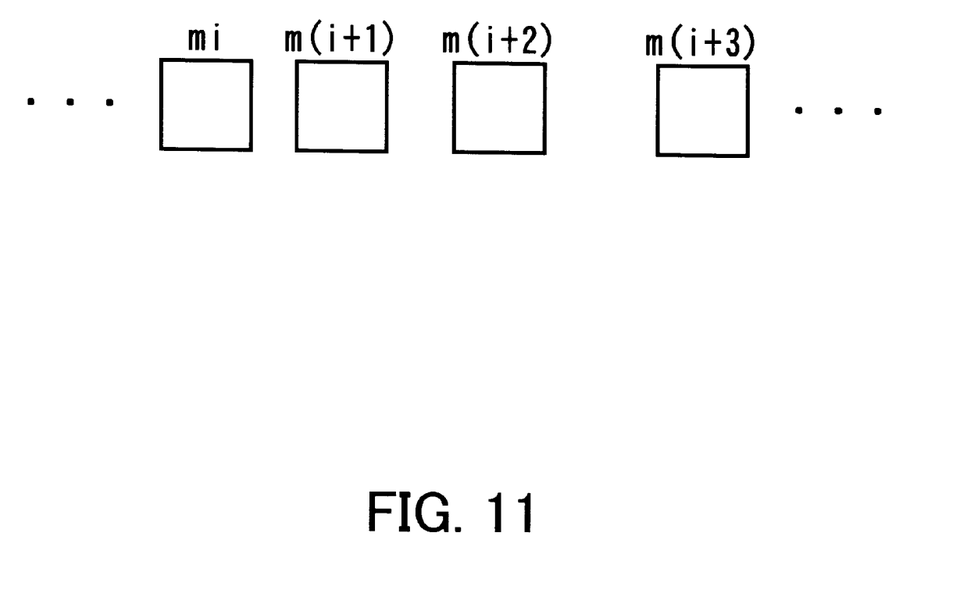
FIG. 11 is a diagram showing another example of arrangement of markers.

Also, as shown in FIG. 11, a plurality of markers may be arranged such that the distances between adjacent markers are different from one another, and an optional pair of markers may be selected from these markers.

Although in the above embodiment, the markers are arranged side by side in the horizontal direction, they may alternatively be arranged in the vertical direction.

Further, in the embodiment, two pairs of markers are arranged in line, but they may be arranged alternately above and below.

As described above, according to the present invention, the distance measuring device for measuring a distance to an object having a plurality of markers by obtaining a distance between images of the markers projected on a light receiving section thereof comprises first marker image acquiring means for acquiring images of a pair of markers separated at a first distance from each other, from among images of the markers projected on the light receiving section, second marker image acquiring means for acquiring images of another pair of markers separated at a second distance from each other, from among the images of the markers projected on the light receiving section, selecting means for selecting the marker images acquired by the first marker image acquiring means or the marker images acquired by the second marker image acquiring means in accordance with a predetermined condition, and computing means for computing a distance to the object based on the marker images selected by the selecting means. Consequently, the distance can be accurately measured irrespective of position relative to the object.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A distance measuring device for measuring a distance to an object having a plurality of markers by obtaining a distance between images of the markers projected on a light receiving section thereof, comprising:

first marker image acquiring means for acquiring images of a pair of markers separated at a first distance from each other, from among images of the markers projected on the light receiving section;

second marker image acquiring means for acquiring images of another pair of markers separated at a second distance from each other, from among the images of the markers projected on the light receiving section;

selecting means for selecting the marker images acquired by said first marker image acquiring means or the marker images acquired by said second marker image acquiring means in accordance with a predetermined condition; and computing means for computing a distance to the object based on the marker images selected by said selecting means.

2. The distance measuring device according to claim 1, wherein said selecting means selects the marker images acquired by said first marker image acquiring means or the marker images acquired by said second marker image acquiring means in accordance with the distance to the object computed by said computing means.

3. The distance measuring device according to claim 1, wherein said selecting means selects the marker images acquired by said first marker image acquiring means or the marker images acquired by said second marker image acquiring means in accordance with distance between the marker images projected on the light receiving section and acquired by said first or second marker image acquiring means and resolution of the light receiving section.

4. The distance measuring device according to claim 1, wherein one of the pair of markers separated at the first distance from each other is identical with one of the pair of markers separated at the second distance from each other.

* * * * *